(12) United States Patent
Daniel et al.

(10) Patent No.: US 7,463,409 B2
(45) Date of Patent: Dec. 9, 2008

(54) FLEXIBLE ELECTROPHORETIC-TYPE DISPLAY

(75) Inventors: Jurgen Daniel, Mountain View, CA (US); Brent S. Krusor, Fremont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 582 days.

(21) Appl. No.: 11/018,185

(22) Filed: Dec. 20, 2004

(65) Prior Publication Data

US 2006/0132579 A1    Jun. 22, 2006

(51) Int. Cl.
G02B 26/00    (2006.01)
G09G 3/34    (2006.01)
G02F 1/133    (2006.01)

(52) U.S. Cl. ............................ 359/296; 345/107; 349/33
(58) Field of Classification Search ................. 359/245, 359/253–254, 265, 290–291, 296; 349/33; 345/107; 430/31, 32
See application file for complete search history.

(56) References Cited

U.S. PATENT DOCUMENTS

| | | | |
|---|---|---|---|
| 4,445,521 A | 5/1984 | Grollier et al. | |
| 6,294,158 B1 | 9/2001 | Dupuis | |
| 6,703,026 B2 | 3/2004 | Dupuis | |
| 6,753,067 B2 | 6/2004 | Chen et al. | |
| 7,119,946 B2 * | 10/2006 | Takeda | 359/296 |
| 2001/0003584 A1 | 6/2001 | Birkel et al. | |
| 2001/0019711 A1 | 9/2001 | Irrgang et al. | |
| 2002/0004035 A1 | 1/2002 | Bhatt et al. | |
| 2002/0126249 A1 | 9/2002 | Liang et al. | |
| 2002/0131152 A1 | 9/2002 | Liang et al. | |
| 2002/0188053 A1 | 12/2002 | Zang et al. | |
| 2003/0004254 A1 * | 1/2003 | Zang et al. | 524/474 |
| 2003/0039022 A1 | 2/2003 | Liang et al. | |

FOREIGN PATENT DOCUMENTS

WO    WO 01/67170 A1    9/2001

OTHER PUBLICATIONS

"Polymers in Cosmetics: Recent Advances" by Robert Y. Lochhead et al., Jul. 2004, pp. 1-9 (http://www.happi.com/current/july042.htm).

Hair Styling 1996, Creative Developments (Cosmetics) Limited), printed Dec. 14, 2004 from website http://www.creative-developments.co.uk/papers/Hair%20Styling%201996.htm, 3 pgs.

(Continued)

Primary Examiner—Scott J Sugarman
Assistant Examiner—Dawayne A Pinkney
(74) Attorney, Agent, or Firm—Bever, Hoffman & Harms, LLP; Patrick T. Bever

(57) ABSTRACT

An electrophoretic-type display device including an array of microcells, where each microcell is formed by a microwell containing a quantity of ink and a polymer-based membrane connected to upper edges of the microwell. The membrane is formed by curing an aqueous or hydroalcoholic sealing solution that is overcoated on the ink-filled microwells. The ink includes an isoparaffinic-based or oil-based suspension fluid, and the peripheral side walls of the microwell have a surface energy in the range of 20 to 30 mN/m. The microwell material serves two purposes: to prevent displacement (floating) of the relatively light ink solution above the relatively heavy sealing solution, and to facilitate reliable attachment between the polymer membrane and microwell walls during subsequent curing.

14 Claims, 4 Drawing Sheets

OTHER PUBLICATIONS

"Acudyne SCP: Stying Conditioning Polymer for Hair gels, mousses and pomades", Chesham Chemical Ltd., printed from website http://www.cheshamchemicals.co.uk/articles/acudyne.htm, 2 pgs.

"Rohm and Haas Personal Care—Acudyne SCP Hair Styling Conditioning Polymer", printed from website http://www.rhpersonalcare.com/pdf/AcudyneSCP.pdf, 8 pgs.

* cited by examiner

FLEXIBLE ELECTROPHORETIC-TYPE DISPLAY

BACKGROUND OF THE INVENTION

1. Field of the Invention

The present invention is directed to non-emissive display devices, and more particularly to flexible particle-based display devices.

2. Related Art

An electrophoretic display represents one type of particle-based, non-emissive display device that includes an array of several thousand independently addressable microcells, each microcell containing a small quantity of electrophoretic ink that is held between a pair of opposed, spaced-apart plate-like electrodes. Each microcell is typically several 10s to 100s of microns in size. The electrophoretic ink includes charged pigment particles suspended in a dyed suspension fluid that is maintained in an enclosed cell region between the electrodes. At least one of the two electrodes is transparent so that the state of the ink can be viewed through the transparent electrode. When a voltage difference is imposed between the two electrodes, the pigment particles migrate to the electrode having a polarity opposite that stored by the pigment particles, thereby facilitating changes in the color displayed through the transparent electrode by selectively changing the electrode polarity. For example, applying a first (e.g., high) voltage potential to the transparent electrode and an opposite (e.g., low) voltage potential to the second electrode causes the pigment particles of a 1-particle ink to migrate to the transparent electrode, thus producing a displayed color that is determined by the pigment particles. Reversal of plate polarity causes the pigment particles to migrate to the second electrode, thereby changing the color appearing on the transparent electrode to that of the dyed suspension fluid. Intermediate color density (or shades of grey) may be obtained by varying the electrode polarity (voltage pulse length and amplitude), thus causing different numbers of pigment particles to migrate toward the transparent electrode. When a 2-particle ink is used, oppositely charged ink particles of different colors migrate to the opposite electrodes depending upon the applied polarity. The display may also contain electrophoretic inks with more than two particles as described in U.S. Pat. No. 6,017,584.

Magnetophoretic displays are another type of particle-based display that utilize a magnetophoretic ink including, for example, dark magnetizable particles suspended in a solution of white non-magnetic particles. The magnetizable particles can be, for example, iron or magnetite particles, and the white particles can be titania based particles or other light-scattering particles. The suspension fluid may be clear, and an added surfactant may be added to help maintain a good dispersion. Upon application of a magnetic field gradient (e.g. by a magnetic needle) the magnetic particles move in the direction of a higher magnetic field strength. This is the principle of a MagnaDoodle display (http://www.howstuffworks.com/magnadoodle6.htm)).

Other particle-based (emissive) displays may consist of suspended fluorescent or phosphorescent particles in which the fluorescence or phosphorescence may be activated by, for example, ultraviolet (UV) light.

With the increase in the demand for flexible (e.g., computer) displays or electric paper, there has arisen a need for particle-based (e.g., electrophoretic or magnetophoretic) displays in which the particle-based ink (e.g., electrophoretic or magnetophoretic ink) is reliably sealed between two flexible substrates. Adjacent microcells of flexible electrophoretic displays are typically separated by vertical side walls to prevent settling and agglomeration of the particles, and serve as spacers between the two opposing electrodes. The height of the microcells is typically in the range of about 5 microns to about 200 microns (particularly in the case of magnetophoretic displays the height may be bigger, e.g., in the range of 500 microns—to one millimeter). It is particularly important for flexible electrophoretic displays to provide segmented microcells so that the ink cannot move between the cells. Otherwise the moving liquid would destroy the written image upon bending the display. Furthermore, paths between the cells tend to cause particle concentration gradients.

Conventional methods for producing flexible electrophoretic displays typically include forming five-sided (open-topped) microwells on a flexible base sheet, inserting a small quantity of electrophoretic ink into each microwell, and then forming an upper flexible membrane that attaches to the upper walls of the microwell to seal the electrophoretic ink. The key to successfully producing flexible electrophoretic displays by this method is to form the upper flexible membrane, which is usually liquid (viscous) or at least tacky in the uncured form, without displacing the ink in the open microwells, or causing the adhesive to interact with the ink in an undesirable manner (e.g., contaminating the ink such that agglomeration occurs).

One conventional approach that addresses the problem of forming membranes without displacing the ink is to utilize a thin layer of a relatively low specific gravity adhesive (or, generally speaking, an "uncured polymer") that floats on a relatively high specific gravity ink. In one version of this method, the ink is inserted in the microwells, the adhesive is dispensed over the filled microcells, and then the adhesive is cured to form a membrane. In a second version, the ink and adhesive are mixed, the mixture is inserted into the microwells and allowed to phase-separate (i.e., the adhesive floats to the top of the ink), and then the adhesive is cured to form a membrane.

A problem with the conventional methods for forming flexible electrophoretic displays is that, by requiring the ink to be relatively heavy (i.e., to have a relatively high specific gravity), the conventional methods require the use of relatively costly or hazardous ink types, such as fluorocarbon or solvent-based inks. That is, the success of these conventional methods depends strongly on the chemical and physical properties of the ink and the sealing layer compound, and as such require the use of high specific gravity ink solvents that are relatively hazardous, thus increasing the risk of injury during both production and after-sale use.

What is needed is a method for reliably producing flexible particle-based display devices that facilitates the beneficial use of low-cost, relatively non-hazardous, low specific gravity inks. What is also needed is a low-cost particle-based display produced by such a method.

SUMMARY OF THE INVENTION

The present invention is directed to a particle-based (e.g., electrophoretic or magnetophoretic) display device including an array of microcells containing a particle-based ink having a low specific gravity (e.g., isoparaffinic-based or oil-based) suspension fluid, and sealed with a polymer-based membrane. To overcome the problems of conventional electrophoretic display production methods, the microwell is formed such that a surface of the microwell wall (i.e., either the material forming the wall structure or a surface coating or surface treatment) has a surface energy preferably in the range of 20 to 30 mN/m, and the polymer membrane is formed by overcoating ink-filled microwells with a sealing solution including a polymer suspended in an aqueous or hydroalcoholic solvent. By providing the microwell walls with the desired surface energy, the microwell walls are sufficiently attractive to the isoparaffinic/oil-based suspension fluid that they prevent "floating" of the ink above the aqueous/ hydroalcoholic sealing solution. In addition, microwell walls having this surface energy are sufficiently attractive to the aqueous/hydroalcoholic sealing solution such that a reliable connection is established between the polymer and the microwell walls, thereby facilitating the reliable production of high quality particle-based display devices.

According to another embodiment of the present invention, a method for producing particle-based display devices includes forming an array of microwells, substantially filling the microwells with an ink solution including pigment particles suspended in an isoparaffinic/oil-based suspension fluid, and then overcoating the filled microwells with a sealing solution including a polymer suspended in an aqueous or hydroalcoholic solvent. The use of relatively light ink and relatively heavy sealing solvent is facilitated by forming or coating/treating the microwell walls such that the walls are sufficiently compatible with both the ink and the sealing solution as to both prevent "floating" of the ink, and to promote secure attachment of the polymer membrane formed as the aqueous/hydroalcoholic solvent evaporates from the sealing solution during subsequent curing.

In one specific embodiment, flexible electrophoretic displays are produced by patterning SU-8 or molding a suitable UV curable polymer to form microwells on a Mylar foil, inserting (e.g., doctorblading or injecting) an ISOPAR-based electrophoretic ink into the microwells, and then overcoating the filled microwells with a polymer-based sealing solution including an ethylester of PVM/MA copolymer in a hydroalcoholic solvent (e.g., as found in the commercial hair spray VO5™).

The invention will be more fully understood in view of the following description of the exemplary embodiments and the drawings thereof.

DETAILED DESCRIPTION

Unless defined otherwise in this specification, all technical terms are used herein according to their conventional definitions as they are commonly used and understood by those of ordinary skill in the art. The term "microwell" refers to cup-like structures formed in a substantially uniform layer of material by photolithographic patterning, molding, microembossing or other manufacturing process. Each microwell thus includes a lower wall (which may be formed by a substrate on which the microwell material is deposited) and one or more peripheral side walls (e.g., a single circular wall, or three or more contiguous substantially straight walls) that extend upward from the bottom wall and surround a predefined lower wall area, with upper edges of the peripheral side walls defining an open end of the microwell. The term "microcell"-refers to an image unit formed by a sealed microwell (i.e., a microwell including an amount of electrophoretic or other ink and having a sealing membrane secured to upper edges of the peripheral walls such that the ink amount is sealed inside an enclosed space defined by the bottom wall, peripheral side walls, and sealing membrane.

Also, positional terms such as "upper", "lower", and "side" are used below and in the appended claims to identify specific structures based on their relative position to related structures. As such, unless otherwise defined, these positional terms are not intended to be limited based on a fixed external reference.

Figure 1:
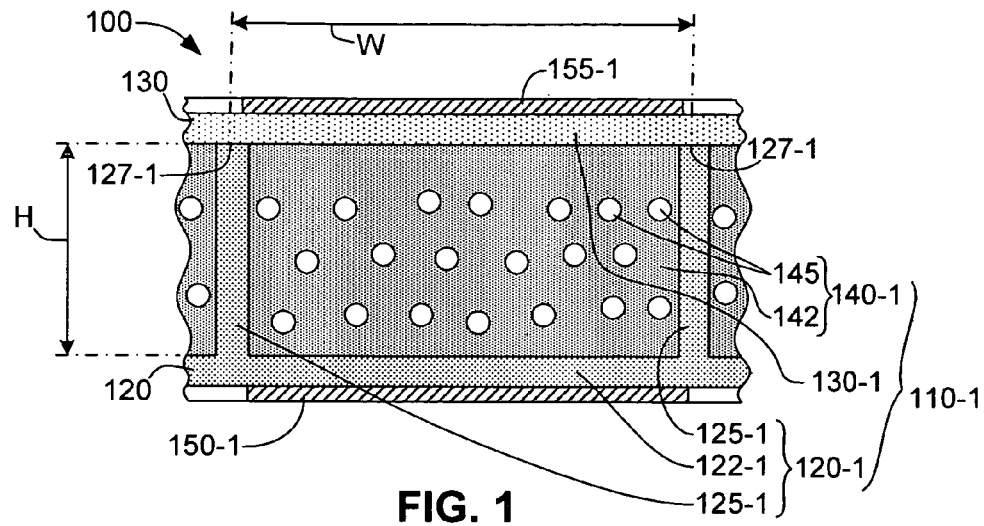
FIG. 1 is a simplified cross-sectional side view showing apportion of an electrophoretic display formed in accordance with an embodiment of the present invention.

FIG. 1 is a cross-sectional side view showing a portion of an electrophoretic display 100 including a microcell 110-1, which represents an exemplary particle-based display device formed in accordance with the present invention. Microcell 110-1 includes a microwell 120-1 formed by a portion of an electrically insulating material layer 120 that is patterned or otherwise processed to form a two-dimensional lower-wall 122-1 and one or more contiguous peripheral side walls 125-1 that extend upward from lower wall 122-1 and completely surround a two-dimensional region defined by lower wall 122-1. A width W of microcell 110-1 (i.e., measured between side walls 125-1) is in the range of 50-1000 microns, and is more preferably in the range of 100-500 microns. A height (depth) H of microcell 110-1 (i.e., measured from an inside surface of lower wall 122-1 and upper edges 127-1 of side walls 125-1) is in the range of 5 to 200 microns, and more preferably in the range of 10 to 100 microns, with an opening to total area ratio of 0.5 to 0.98. Microcell 110-1 also includes a membrane (upper wall) 130-1 formed by a portion of a sealing membrane layer 130 that is adhered to upper edges 127-1 of side walls 125-1 and extends over microwell 120-1 to form a sealed enclosure defined by bottom wall 122-1, side walls 125-1 and membrane 130-1. Located inside this sealed enclosure is an amount of electrophoretic ink ("electrophoretic ink quantity") 140-1 that, in a 1-particle embodiment, includes charged pigment particles 142 in a dyed suspension fluid 145 (alternatively, a 2-particle ink may include oppositely charged particles of different colors in a clear suspension fluid). Electrodes 150-1 and 155-1 are respectively provided under lower wall 122-1 and over membrane 130-1, and are connected by control circuitry (not shown) to selected voltage sources. At least one of lower wall 122-1 and membrane portion 130-1 and the associated electrode(s) are transparent.

Figure 2A:
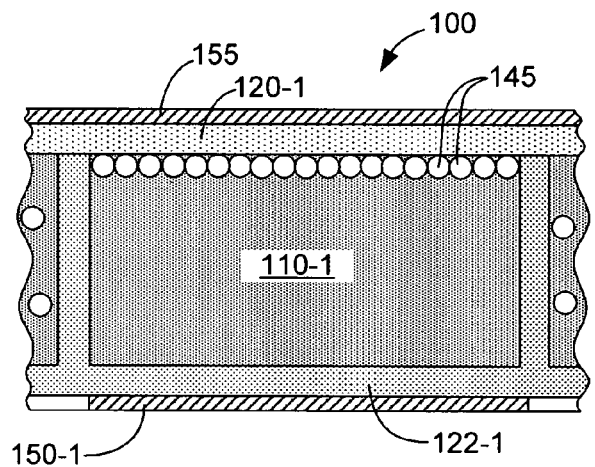
FIGS. 2(A) and 2(B) are cross-sectional side views showing the electrophoretic display of FIG. 1 during operation.
Figure 2B:
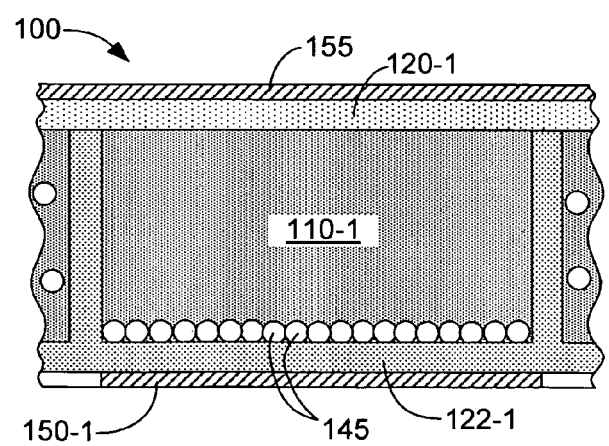

FIGS. 2(A) and 2(B) are cross-sectional side views showing microcell 110-1 during operation. When a voltage difference is imposed between the electrodes 150-1 and 155-1, charged pigment particles 142 migrate toward the electrode of opposite polarity. For example, as indicated in FIG. 2(A), when pigment particles 142 are negatively charged and subject to a field produced by a relatively high (with respect to the potential on electrode 150-1) positive voltage potential on upper electrode 155-1, pigment particles 142 migrate upward against membrane portion 130-1, thereby causing microcell 110-1 to appear substantially the color of pigment particles 142 when viewed through membrane portion 130-1. Conversely, when a negative (with respect to the potential on electrode 150-1) voltage potential is applied on upper electrode 155-1, pigment particles 142 migrate downward against lower wall 122-1, thereby causing microcell 110-1 to appear the color of dyed suspension fluid 145 (or, in 2-particle inks, the color of the oppositely charged particle) when viewed through membrane portion 130-1.

According to an embodiment of the present invention, display 100 is formed using a method similar to conventional overcoating methods (mentioned above), but is distinguished in the particular materials used to form microcell 110-1. In particular, the success of the overcoating method performed in accordance with the present invention is very sensitive to the combined material choices of electrophoretic ink, microwell surface material, and the polymer solution used to form the sealing membrane. It is important that the combination of electrophoretic ink, microwell surface material, and sealing solution is well chosen, otherwise the following effects can occur: a) the ink gets pulled out of the microwells during doctorblading of the sealing solution (this happens, for example, if the surface of the microwells has low surface energy and the capillary forces on the ink inside the microwells are weak); b) the sealing solution pulls back and does not wet the surface (this happens for example if the microwell walls are very hydrophobic or if the ink repels the sealing solution); or c) the sealing solution mixes with the ink (this happens if the ink and the sealing solution are too compatible).

According to an aspect of the present invention, suspension fluid 145 of electrophoretic ink 140-1 includes an isoparaffinic-based solvent (e.g., ISOPAR™) or an oil-based solvent (e.g., a silicone-oil-based solvent), and the peripheral side walls 125-1 of the microwell 120-1 includes a wall material or wall coating/treatment such that the surface of peripheral side walls 125-1 have a surface energy in the range of 20 to 30 mN/m (e.g., an epoxy-type, near-UV photoresist such as SU-8). As discussed in additional detail below, this combination facilitates the production of microcell 110-1 using a polymer-based sealing solution to form membrane portion 130-1 that includes one of an alkylester of PVM/MA copolymer (e.g., Poly(methyl vinyl ether-alt-maleic acid monoethyl ester)(CAS Reg. No. 25087-06-3), Poly(methyl vinyl ether-alt-maleic acid monobutyl ester) (CAS Reg. No. 25119-68-0), Poly(methyl vinyl ether-alt-maleic acid monoisopropyl ester)(CAS Reg. No. 31307-95-6)), or PVP-VA (Maleic acid monoisopropyl ester-vinyl methyl ether copolymer, Poly(1-vinylpyrrolidone-co-vinyl acetate copolymer) (CAS Reg. No. 25086-89-9 suspended in an aqueous or hydroalcoholic solvent. Those skilled in the art will recognize that an electrophoretic ink including isoparaffinic, oil-based or silicone-oil-based suspension fluid provides an advantage in that it is inexpensive, has low VOC (volatile organic compounds), and is also preferred for safety reasons (e.g., the suspension fluids are relatively environmentally friendly, i.e., non-hazardous) compared to display fluids that rely on fluorocarbons (of which some are expensive and some may damage the ozone layer) or solvents (which can be harmful to persons when touched or when the vapors are inhaled), as used in conventional methods. Although isoparaffinic, oil-based or silicone-oil-based suspension fluids are presently preferred, suitable suspension fluids may be formed using less environmentally friendly solvents such as toluene and xylenes. The present inventors have also determined that a polymer-based sealing solution including an ethylester of PVM/MA copolymer suspended in an aqueous or hydroalcoholic solvent produces a superior membrane. Those skilled in the art will also recognize that the choice of an aqueous/hydroalcoholic-based sealing solution precludes mixing problem "c" (discussed above) due to the oil-in-water repulsion between the suspension fluid and the sealing solution solvent. However, although the isoparaffinic/oil-based suspension fluid (ink solvent) will not mix with the aqueous/hydroalcoholic-based sealing solution, the ink solvent may become displaced (i.e., "float") above the sealing solution due to its lower specific gravity (the lower specific gravity of the suspension fluid is not a necessary requirement, though). The key, therefore, is to form microwell 120-1 using a wall material that both (1) is attractive enough to the electrophoretic ink to prevent both problem "a" (discussed above; i.e., loss of ink during doctorblading) and "floating" displacement of the ink on the sealing solution, and (2) is attractive enough to the aqueous/hydroalcoholic-based sealing solution to facilitate reliable attachment of the membrane to the side walls of the microwell, thus avoiding problem "b" (discussed above; i.e., delamination of the membrane). The present inventors have determined that these beneficial characteristics are achieved when the microwell is formed from a wall material having a surface energy in the range of 20 to 30 mN/m, and in one specific embodiment by utilizing SU-8. SU-8 has been determined experimentally to provide both sufficient attraction to isoparaffinic/oil-based electrophoretic ink and sufficient attraction to aqueous/hydroalcoholic-based sealing solution to reliably and repeatably produce high quality electrophoretic display devices.

According to a specific embodiment of the present invention, an Isopar-based electrophoretic ink 140-1 was formed by mixing 1 ml Isopar M (Exxon) with 0.15 g $TiO_2$ (non-chalking), TINT-AYD PC9003, from Elimentis Specialities, Hightstown, N.J. (white pigments), 8 mg Sudan Red 7B (red dye), and 14 mg LamChem PE113 from Lambent Technologies as dispersant. The ingredients were ground in an attritor mill to decrease the particle size, and the resulting ink was tested in a test cell and consisting of approximately 80 micron high SU-8 cells in a parallel plate configuration. At a voltage potential of approximately 120V the ink showed acceptable red/white contrast. SU-8 (from MicroChem, Corp.) cells were filled with this ink and successfully overcoated with a sealing solution comprising V05™ hairspray. The present inventors found this combination of materials to facilitate a highly repeatable and reliably production process that greatly simplifies the production of flexible electrophoretic displays, thereby overcoming the production problems associated with conventional methods.

According to another specific embodiment of the present invention, silicone-based electrophoretic ink was formed by mixing 1 ml Dow Corning 200 (50 cst) silicone oil, 0.15 g $TiO2$ (non-chalking), TINT-AYD PC9003, from Elimentis Specialities, and 4 mg blue dye (e.g., Oil Blue N from Aldrich, Milwaukee, Wis.). The ingredients are ground in an attritor mill to decrease the particle size, and some blue/white contrast was observed when switching the ink in a similar test cell as the one mentioned above. The ink was then successfully sealed in SU-8 cells according to the sealing method described above. The inventors believe Dow Corning 510 may be utilized in place of Dow Corning 200.

Other potential pigments, dyes, charge additives and suspending fluids for forming electrophoretic inks that can be utilized in accordance with the present invention are listed in U.S. Pat. No. 6,067,185 and U.S. Pat. No. 5,745,094.

FIGS. 3(A) through 3(D) are simplified cross-sectional side views illustrating the basic process steps associated with the production of microcell 110-1 according to another embodiment of the present invention.

Figure 3A:
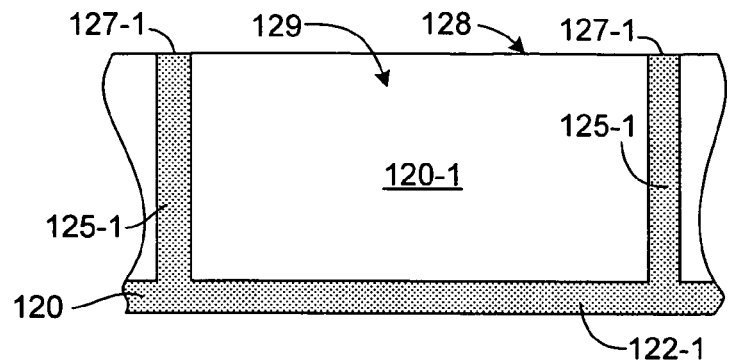
FIGS. 3(A), 3(B), 3(C) and 3(D) are simplified cross-sectional views illustrating a production method for producing the electrophoretic display of FIG. 1 according to another embodiment of the present invention.

Referring to FIG. 3(A), the production method begins by forming a cup-like microwell structure 120-1 in an insulating material layer 120 including lower wall 122-1 and one or more peripheral side walls 125-1 extending upward from lower wall 122-1. Peripheral side walls 125-1 have upper edges 127-1 defining an opening 128 through which an electrophoretic ink may be inserted into a microcavity 129 defined by lower wall 122-1 and side walls 125-1.

In one specific embodiment, microwell 120-1 is fabricated by depositing an epoxy-type, near-UV photoresist (e.g., SU-8) layer 120 on a flexible substrate (e.g., an Indium Tin-Oxide (ITO) coated Mylar sheet having a thickness of 50-250 microns, and then patterning the photoresist using known photolithographic techniques to form an array of microwell structures that are substantially identical to microwell 120-1. Alternatively, the microwell structures may be patterned directly onto an active matrix backplane, thereby providing the lower electrode described above with reference to FIG. 1.

In an alternative embodiment, microwell 120-1 is molded by transferring a pattern (e.g. in SU-8) into silicone to form a mold, which is then used to replicate the desired structures in a curable (e.g., UV curable, heat curable, or catalyst assisted curable) polymer layer. In particular, Sylgard 184 silicone (Dow Corning Corporation) is used to form the mold, and the UV polymer 60-7165 (urethane acrylate produced by Epoxies, Etc. of Cranston R.I.) is used to fabricate the replicated structures. Curable polymers include, for example, acrylic or epoxy-based photopolymers (i.e., imaging compositions based on polymers/oligomers/monomers which can be selectively polymerized and/or crosslinked upon imagewise exposure by light radiation such as ultra-violet light) or radiation curable polymers. In one specific embodiment, a mixed composition resin was formed by mixing the epoxy-based polymer 60-7155 and urethane acrylate 60-7165 (both from Epoxies, Etc. of Cranston). The cured UV polymer layer is flexible and it does not swell in ISOPAR. In one embodiment, microwell 120-1 is molded onto a thin sheet of Mylar (not shown). In this case the molding process has to be adjusted so that only a thin (a few microns) polymer layer remains at the bottom to form the lower walls of each microwell. The molded polymer may have to be cleaned (e.g. plasma clean or solvent clean) in order to remove silicone residue from the molding process. A surface coating or surface treatment may also be applied to the molded microwell to produce the desired surface energy.

In addition to photolithography and molding, several other alternative fabrication methods may be utilized to produce microwell 120-1. For example, microwell 120-1 may also be formed by microembossing or a known microfabrication method (e.g. etching, laser ablation, etc.). Moreover, in addition to using photoresist and UV polymers, other polymer systems (e.g., two-component systems) may also be used to form microwell 120-1.

Figure 3B:
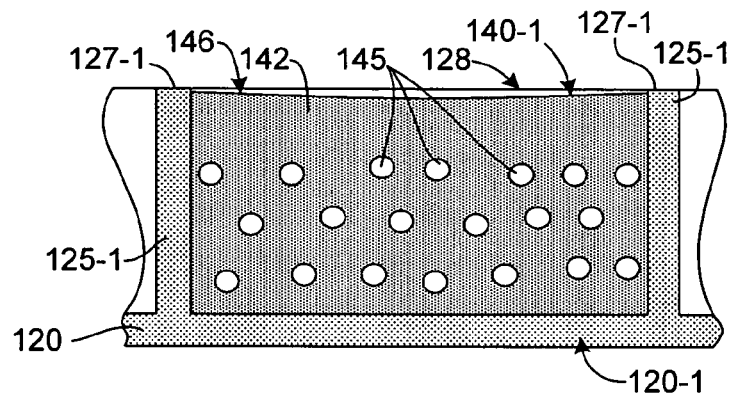

Referring to FIG. 3(B), electrophoretic ink quantity 140-1 is then inserted into microwell 120-1 through opening 128. As discussed above, electrophoretic ink quantity 140-1 includes electrophoretic (charged) pigment particles 142 dispersed in a suspension fluid 145 (i.e., either an isoparaffinic-based solvent such as ISOPAR, or an oil-based solvent or silicone oil) having a surface tension in the range of 18 to 30 mN/m. Other surface tension values may be possible if the values for the walls and the sealing solution change accordingly. The viscosity of the suspending fluid may also affect how broad this range can be. The insertion process is preferably performed such that the cells are slightly underfilled (i.e., such that upper edge 127-1 of side walls 125-1 extends above an upper surface 146 of electrophoretic ink quantity 140-1. In alternative embodiments, the insertion process is performed using doctorblading or injection by inkjet printing or spray coating and evaporating the excess ink.

Figure 3C:
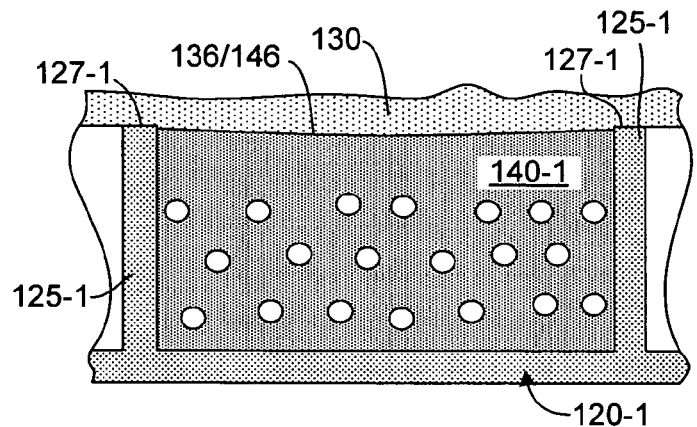

FIG. 3(C) depicts overcoating microwell 120-1 with a sealing solution layer 130 including a polymer suspended in one of an aqueous solution and a hydroalcoholic solvent. In one embodiment, sealing solution layer 130 is overcoated by doctorblading or curtain coating sealing solution onto upper edge 127-1 of side walls 125-1 such that a lower surface 136 of sealing solution layer 130 contacts upper surface 146 of electrophoretic ink solution 140-1. In a currently preferred embodiment, sealing solution layer 130 includes an aqueous/hydroalcoholic solvent containing an ethylester of PVM/MA copolymer (i.e., a film forming polymer: monoethyl ester of poly (methyl vinyl ether/maleic anhydride)) having a surface tension of about 100-140 mN/m. Sealing solution layer 130 may include several additional additives including (but not limited to) aminomethylpropanol (makes the film more resistant to humidity), triethyl citrate (plasticizer, and reduces tackiness), and dimethicone copolyol (surfactant and reduces tackiness). In one specific embodiment the aqueous/hydroalcoholic solvent includes 40% ethanol in water. Sealing solution layer 130 may also contain a dye or pigments to change the display color (in case the sealed side is the viewed side), and may contain nanoparticles to increase or lower its refractive index (e.g., if index matching to a glass substrate is desirable). Moreover, conductive materials such as carbon nanotubes and Baytron conductive polymer may be added (this may be particularly useful in magnetophoretic displays to dissipate static charge). As discussed above, by forming microwell 120-1 using a material having a surface energy in the range of 20 to 30 mN/m and by forming microwell 120-1 such that it has a width in the range of 50 to 1000 microns, the attraction between electrophoretic ink solution 140-1 and peripheral side walls 125-1 produces a force on electrophoretic ink solution 140-1 that prevents upward displacement (floating) of the lighter electrophoretic ink solution 140-1 above sealing solution layer 130. Accordingly, sealing solution layer 130 is stably and reliably supported by electrophoretic ink solution 140-1 and upper edges 127-1 of side walls 125-1 in an ideal position to form a polymer membrane.

Figure 3D:
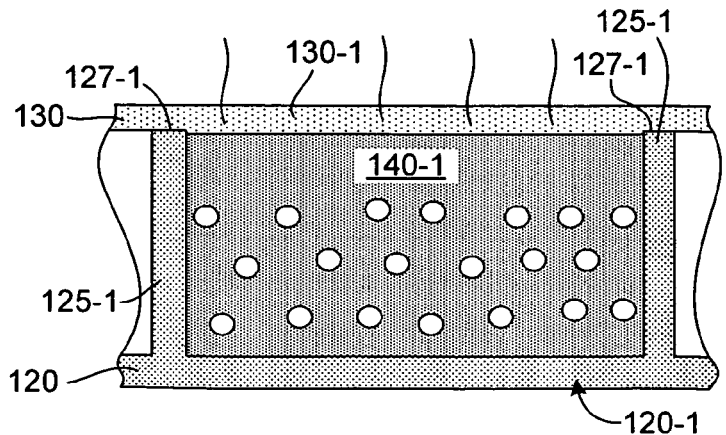

FIG. 3(D) depicts curing of the sealing solution (indicated by vertical wavy lines) such that the aqueous/hydroalcoholic solvent is evaporated from the sealing solution, thereby causing the remaining polymer to form membrane 130-1 that covers the microwell opening, thereby sealing electrophoretic ink solution 140-1 inside a chamber formed by microwell 120-1. The sample may be heated to an elevated temperature (e.g., up to 90° C.) in order to achieve more complete evaporation of the aqueous/hydroalcoholic solvent). As discussed above, by forming microwell 120-1 using a material having a surface energy in the range of 20 to 30 mN/m, the attraction between sealing solution layer 130 and peripheral side walls 125-1 produces a secure connection between membrane 130-1 and upper edges 127-1 of side walls 125-1 (however, in general the surface energy values may be much broader, e.g. by adding adequate surfactants to the aqueous/hydroalcoholic solution we may be able to broaden the ranges).

Membrane 130-1 can be made more robust by coating another material over membrane 130-1 after the curing process. In one embodiment, a photosensitive polymer (Dymax 401) is coated on membrane 130-1, and then cross-linked with UV light. A very smooth surface is formed by pressing the polymer flat with a Mylar sheet. After UV exposure the Mylar is peeled off, which is possible due to its poor adhesion to the polymer.

The present inventors found that a commercially available liquid hairspray (VO5™, produced by Alberto-Culver USA, Inc.) can be used as the sealing solution used to seal the ink-filled microcells described above. Like the preferred embodiment, this hairspray is based on ethylester of PVM/MA copolymer, and includes aminomethylpropanol, triethyl citrate, and dimethicone copolyol, along with fragrance and a diisopropyl adipate emollient. The hairspray, which comes in form of a liquid, was simply spread over the filled microcells with a doctorblade made from a sheet of Mylar foil. Afterwards, the layer was cured (the solvent was evaporated off) with a warm air gun. The inventors found that the resulting membrane became brittle and started to crack after a few days (i.e., after it had dried completely). For this reason PEG 20,000 (polyethylene glycol) was added at approximately 2-4% (wt) to the sealing solution as a plasticizer with good results. PEG also seems to reduce the surface tension of the sealing solution layer, preventing it from beading up in some cases. It was also found that an increased viscosity of the sealing solution produced better results concerning pull-back/de-wetting (the de-wetting is much less pronounced). A higher viscosity was achieved by evaporating off some of the solvent. Reducing the liquid volume to 40% of the original volume resulted in a quite useful viscosity. A higher viscosity of the sealing solution also produced a thicker membrane. Thicker membrane layers are also achieved by applying several layers of the polymer. The adhesion of this material to the SU-8 cell walls was very good. In delamination tests the SU-8 walls lifted off the ITO substrate instead.

According to another specific embodiment, the sealing solution layer includes an aqueous/alcoholic carrier (hydroalcoholic solution) and a silicone component. One component in the hairspray-based sealing polymer is silicone. It is known that silicones reduce adhesion (e.g., they are often used in de-molding applications). The inventors have observed in experiments that the particle adhesion seems to be lower when silicone is present in the surface layer. This means that the contrast can be higher and the display may switch faster (the inventors observed faster switching speed and a better dark state in a one-particle ink system). However, silicone by itself swells when in contact with ISOPAR, and silicone oil may leach out into the ink, which changes the ink's behavior. Many silicones are usually also not compatible with aqueous solutions. However, there is a group of hydrophilic (organomodified silicones) that are compatible with aqueous systems. These organomodified silicones have slight to complete solubility in water and are composed of dimethylsiloxane molecular backbones in which some of the methyl groups are replaced by polyalkylenoxy groups linked through a propyl group to the silicon atom (e.g., DBE or DBP polymers from Gelest, Inc.). These organomodified silicones are also called dimethiconecopolyols (see, for example, U.S. Pat. No. 6,703,026, column 5). Other examples of dimethiconecopolyols are BC403 from Basildon Chemicals or Ultrasil™ dimethicone copolyol blends (blend with polyethylene glycol) from Noveon, Inc.

Figure 4:
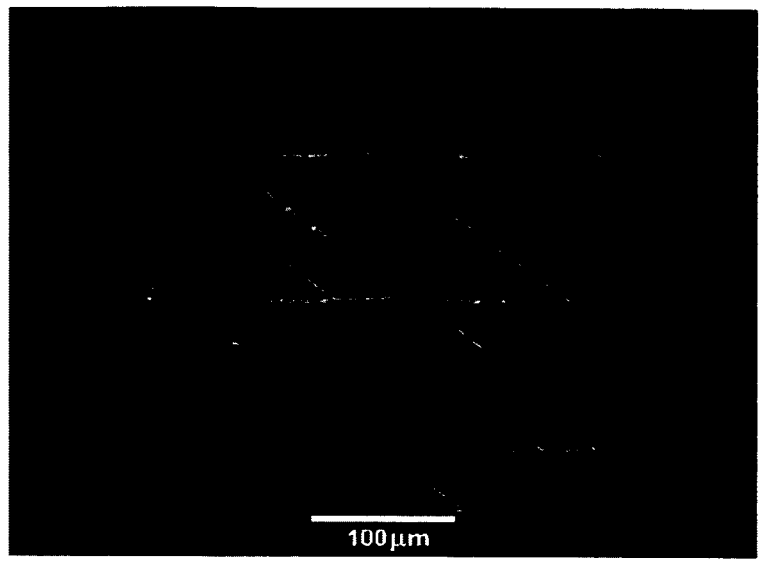
FIG. 4 is an SEM image showing molded microwells formed on a flexible substrate in accordance with an embodiment of the present invention.
Figure 5:
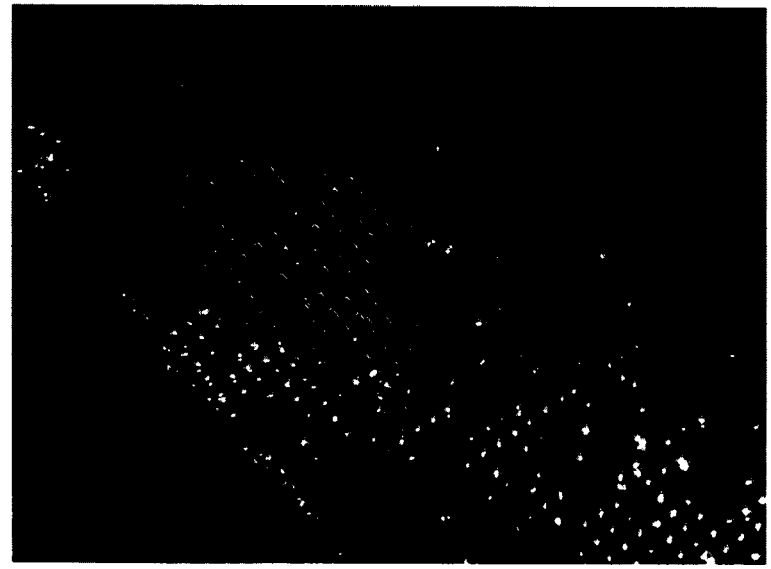
FIG. 5 is a photograph showing completed microcells formed in accordance with an embodiment of the present invention.
Figure 6:
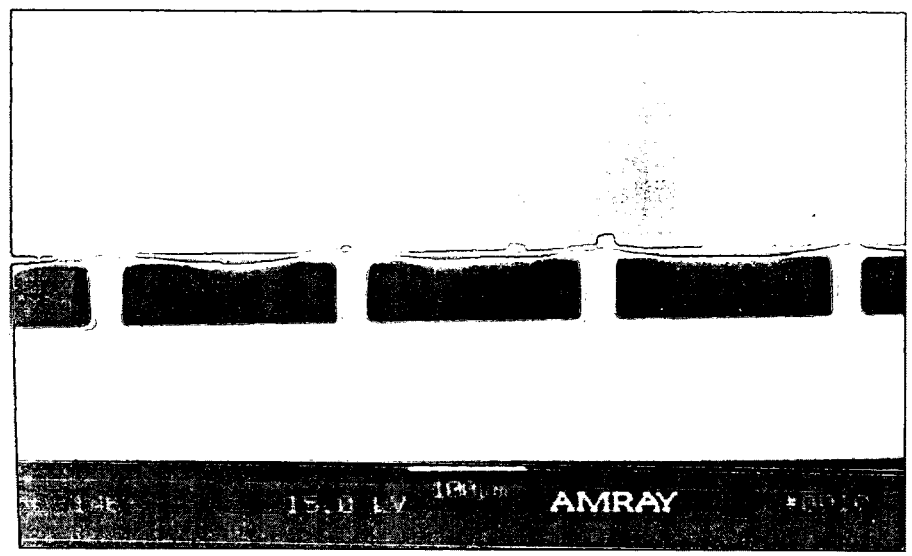
FIG. 6 is an SEM image showing SU-8 microcells formed in accordance with an embodiment of the present invention.
Figure 7:
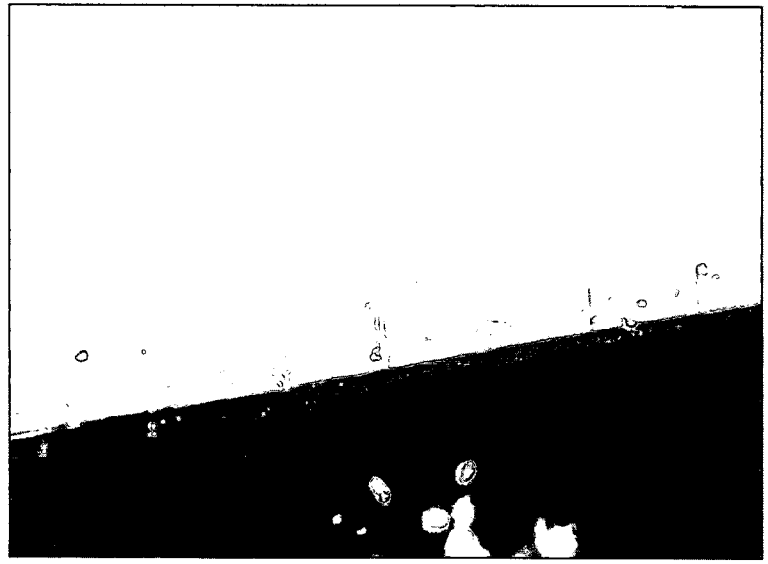
FIG. 7 is an SEM image showing SU-8 microcells formed in accordance with an embodiment of the present invention.

FIGS. 4 through 7 are pictures of electrophoretic media fabricated in accordance with the present invention. FIG. 4 is a Scanning Electron Microscopy (SEM) image showing molded microwells formed on a Mylar foil. FIG. 5 is a photograph showing completed microcells with SU-8 walls. The microcells are approximately 200 microns wide and 50 microns deep. FIG. 6 is an SEM image of sealed microcells, and shows a thin membrane with excellent adhesion to the SU-8 walls (no delamination is visible after breaking the sample in half). FIG. 7 is an SEM image of a sealed sample (filled with purple electrophoretic ink). The sample was broken in half and ink has evaporated from the broken cells. Notice that there is little particle adhesion visible on the membrane; it appears rather transparent.

In accordance with another specific embodiment of the present invention, a magnetophoretic display was produced by incorporating a magnetophoretic ink in a display structure such as that described above. The magnetophoretic ink was produced by mixing 1 ml Isopar M, 14 mg LamChem PE113 from Lambent Technologies as dispersant, 100 mg white Ti-pure R700 $TiO_2$ (titania) particles from Dupont, and 26 mg Iron(II,III) oxide from Alfa Aesar. The mixture was agitated by ultrasonic agitation for approximately five minutes. The inventors observed a dark/white contrast when a magnet is brought in close proximity with the ink (the Iron oxide particles were magnetized by the magnetic field and attracted towards the magnet; the white non-magnetic pigments are being displaced by the dark magnetic particles which causes a contrast). The Isopar-based magnetophoretic ink was then successfully sealed in SU-8 cells using the sealing method described above.

In addition to the specific embodiments described above, other combinations of the features associated with the present invention may be advantageously combined. For example, the sealing method described herein may be useful for sealing other liquids (non-aqueous, non-alcoholic) such as liquid crystals, oils, etc. In addition, although the present invention is described above with specific reference to electrophoretic and magnetophoretic particle-based displays, the various aspects and features of the present invention may be utilized to form display devices using ink solutions containing other particle types (e.g., fluorescent or phosphorescent) and may also be utilized to contain liquids in non-display devices. Accordingly, unless otherwise specified, the appended claims should not necessarily be interpreted as directed to electrophoretic and magnetophoretic displays.

The invention claimed is:

1. A method for manufacturing a display device, the method comprising:

forming a microwell including a lower wall and one or more peripheral side walls extending upward from the bottom wall, wherein an upper edge of the peripheral cell wall defines an opening;

inserting an ink solution into the microwell structure through the opening, wherein the ink solution includes particles and one of an isoparaffinic-based suspension fluid and an oil-based suspension fluid;

overcoating the microwell with a sealing solution including a polymer suspended in one of an aqueous solution and a hydroalcoholic solution; and curing the sealing solution such that the polymer forms a membrane that adheres to the upper edge of peripheral side wall and covers the opening, thereby sealing the ink solution inside the microwell, wherein the sealing solution comprises one of an alkylester of PVM/MA copolymer and PVA/VA.

2. The method according to claim 1, wherein forming the microwell comprises depositing and patterning a photoresist layer.

3. The method according to claim 1, wherein forming the microwell comprises depositing and patterning an electrically insulating material layer.

4. The method according to claim 3, wherein depositing and patterning the electrically insulating material layer comprises depositing and patterning SU-8 on a flexible substrate.

5. The method according to claim 4, wherein depositing SU-8 on a flexible substrate comprises depositing the SU-8 on one of a Mylar sheet and an Indium Tin-Oxide (ITO) coated substrate.

6. The method according to claim 1, wherein forming the microwell comprises generating a mold, and using the mold to replicate a desired microwell structure in a curable polymer layer.

7. The method according to claim 1, wherein inserting the ink solution comprises inserting an amount of an electrophoretic ink solution into the microwell such that the upper edge of the peripheral cell wall extends above or is substantially at the same level of an upper surface of the electrophoretic ink solution.

8. The method according to claim 7, wherein inserting the ink solution comprises doctorblading the amount of the electrophoretic ink solution into the microwell.

9. The method according to claim 7, wherein inserting the ink solution comprises injecting the predetermined amount of the electrophoretic ink solution into the microwell.

10. The method according to claim 1, wherein overcoating the microwell comprises spreading the sealing solution over the upper edge of the peripheral cell wall by doctorblading.

11. The method according to claim 10, wherein overcoating the microwell comprises curtain coating the sealing solution over the upper edge of the peripheral cell wall.

12. The method according to claim 1, wherein the sealing solution further comprises one or more of aminomethylpropanol, triethyl citrate, a dimethicone copolyol, a dye, pigments, refractive index altering nanoparticles, conductive materials, polyethylene glycol, and silicone.

13. The method according to claim 1, further comprising coating an additional material layer on the cured membrane.

14. A method for manufacturing a display device, the method comprising:
    forming a microwell including a lower wall and one or more peripheral side walls extending upward from the bottom wall, wherein an upper edge of the peripheral cell wall defines an opening, and wherein the microwell comprise a wall material having a surface energy in the range of 20 to 30 mN/m;
    inserting an ink solution into the microwell structure through the opening, wherein the ink solution includes pigment particles suspended in one of an isoparaffinic-based suspension fluid and a silicone oil-based suspension fluid); and
    overcoating the microwell with a sealing solution including a polymer suspended in one of an aqueous solvent and a hydroalcoholic solvent, wherein the sealing solution comprises one of an alkylester of PVM/MA copolymer and PVA/VA.

* * * * *